(12) United States Patent
Kawabe

(10) Patent No.: US 7,926,014 B2
(45) Date of Patent: Apr. 12, 2011

(54) CLOCK-GATING CIRCUIT INSERTION METHOD, CLOCK-GATING CIRCUIT INSERTION PROGRAM AND DESIGNING APPARATUS

(75) Inventor: Yukihito Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 541 days.

(21) Appl. No.: 12/034,156

(22) Filed: Feb. 20, 2008

(65) Prior Publication Data

US 2008/0201674 A1    Aug. 21, 2008

(30) Foreign Application Priority Data

Feb. 20, 2007  (JP) ................. 2007-039353

(51) Int. Cl.
*G06F 17/50* (2006.01)
(52) U.S. Cl. ........................ 716/114; 716/113
(58) Field of Classification Search .......... 716/5, 6, 716/113, 114
See application file for complete search history.

(56) References Cited

U.S. PATENT DOCUMENTS

| | | | | |
|---|---|---|---|---|
| 6,272,667 B1 * | 8/2001 | Minami et al. | | 716/6 |
| 6,318,911 B1 * | 11/2001 | Kitahara | | 716/6 |
| 6,668,363 B2 * | 12/2003 | Minami et al. | | 716/6 |
| 7,197,725 B2 * | 3/2007 | Takeoka et al. | | 716/4 |
| 2001/0029599 A1 * | 10/2001 | Minami et al. | | 716/6 |

FOREIGN PATENT DOCUMENTS

| | | |
|---|---|---|
| JP | 2002-190528 | 7/2002 |
| JP | 10-283381 | 10/2008 |

* cited by examiner

*Primary Examiner* — Vuthe Siek
(74) *Attorney, Agent, or Firm* — Staas & Halsey LLP

(57) ABSTRACT

A clock-gating circuit insertion method includes inserting a clock-gating circuit into a position detected on the basis of a circuit data. Timing analysis of an enable signal is performed for the clock-gating circuit. An upper limit of delay variations for the enable signal is calculated to satisfy setup conditions on the basis of the result of the timing analysis. A selector-equipped clock-gating circuit including a selector circuit and a clock-gating circuit is inserted into the candidate position for insertion. The selector circuit selects and outputs the enable signal when delay variations are not above the upper limit. The selector circuit selects and outputs a signal designating the passing of a clock signal when the delay variations are above the upper limit. The clock-gating circuit passes or intercepts the clock signal on the basis of the output signal of the selector circuit.

14 Claims, 14 Drawing Sheets

CLOCK-GATING CIRCUIT INSERTION METHOD, CLOCK-GATING CIRCUIT INSERTION PROGRAM AND DESIGNING APPARATUS

CROSS-REFERENCE TO RELATED APPLICATIONS

This application claims the benefit of priority of Japanese Patent Application No. 2007-39353, filed on Feb. 20, 2007, the entire contents of which are incorporated herein by reference.

BACKGROUND

1. Field

The embodiment relates to a clock-gating circuit insertion method, a clock-gating circuit insertion program and a designing apparatus for inserting clock-gating circuits into an integrated circuit.

2. Description of the Related Art

A clock-gating circuit may be inserted midway on a clock tree during a conventional design of a semiconductor integrated circuit. The clock gating circuit reduces the power consumption of the semiconductor integrated circuit. As a designing apparatus and method for supporting insertion of a clock-gating circuit, the following proposals have been made.

One conventional designing apparatus for a semiconductor integrated circuit generates timing restrictions given to the enable logic, calculates the delay time in the enable logic, and determines whether or not the calculated delay time satisfies the generated timing restrictions. The conventional designing apparatus uses information concerning at least a logic circuit which was not clock-gated, information concerning enable logic for controlling clock outputs, and information concerning the gating circuit. If the calculated delay time satisfies the generated timing restrictions, a clock-gated logic circuit is produced by adding the gating circuit and a circuit configured of the enable logic to the logic circuit. The conventional designing apparatus outputs information concerning the clock-gated logic circuit and timing restrictions concerning the enable logic.

Another conventional design support method for semiconductor integrated circuits begins by setting the delay time of a gated buffer to a register as a first parameter representing the delay time from the gated buffer. Next, a first timing restriction is given to the gated clock part with the first parameter taken into account. Timing analysis of the circuit including the gated clock part subject to the first timing restriction is performed. Whether or not the gated clock part satisfies the first timing restriction is determined from the result of the timing analysis. A second parameter representing the delay time from the gated buffer is set to the register after the gated clock part has satisfied the timing restriction and the circuit has been processed for wiring. The delay time from the gated buffer register cell is driven by this gated buffer. A second timing restriction is given to the gated clock part with the second parameter taken into account. Timing analysis of the circuit including the gated clock part is performed subject to the second timing restriction. Finally, whether or not the gated clock part satisfies the second timing restriction is determined from the result of the timing analysis.

The aforementioned conventional designing apparatus and method for semiconductor integrated circuits limit the position at which the clock-gating circuit can be inserted to locations where the setup conditions for the enable signal were satisfied in the timing analysis at the time of designing. The setup conditions for the enable signal are the conditions necessary for the enable signal to reach a clock-gating circuit before the arrival of the edge of the clock signal, in order to enable the clock-gating circuit to pass or intercept the clock signal.

FIG. 1 shows conventional positions for insertion of clock-gating circuits. A delay of the enable signal prevents clock-gating circuits 142 from being inserted upstream (the side closer to the clock source) of a clock tree 141, and the clock-gating circuits 142 can be inserted only downstream of the clock tree 141.

FIG. 2 shows other conventional positions for insertion of clock-gating circuits. Delays of the enable signals also prevent the clock-gating circuits from being inserted upstream (the side closer to the clock source) of the clock tree 141 where clock-gating circuits 142, 143, 144 and 145 operated by different enable signals are inserted on the downstream side of the clock tree 141, and so the clock-gating circuits 142 can be inserted only downstream of the clock tree 141.

As described so far, the aforementioned conventional designing apparatus and method for semiconductor integrated circuits involve a problem that clock-gating circuits cannot be inserted in positions which logically should allow their insertion, if setup conditions are not satisfied and their insertion would be considered violation of the setup conditions, and accordingly sufficient saving of power consumption cannot be achieved.

SUMMARY

The embodiment provides a clock-gating circuit insertion method including inserting a clock-gating circuit into a position detected on the basis of a circuit data, performing timing analysis of an enable signal for the clock-gating circuit, calculating an upper limit of delay variations for the enable signal to satisfy setup conditions on the basis of the result of the timing analysis; and inserting a selector-equipped clock-gating circuit including a selector circuit and a clock-gating circuit into the candidate position for insertion, wherein the selector circuit selects and outputs the enable signal when delay variations are not above the upper limit, and selects and outputs a signal designating the passing of a clock signal when the delay variations are above the upper limit, and the clock-gating circuit passes or intercepts the clock signal on the basis of the output signal of the selector circuit.

The above-described embodiments are intended as examples, and all embodiments are not limited to including the features described above.

DETAILED DESCRIPTION OF THE EMBODIMENTS

Figure 1:
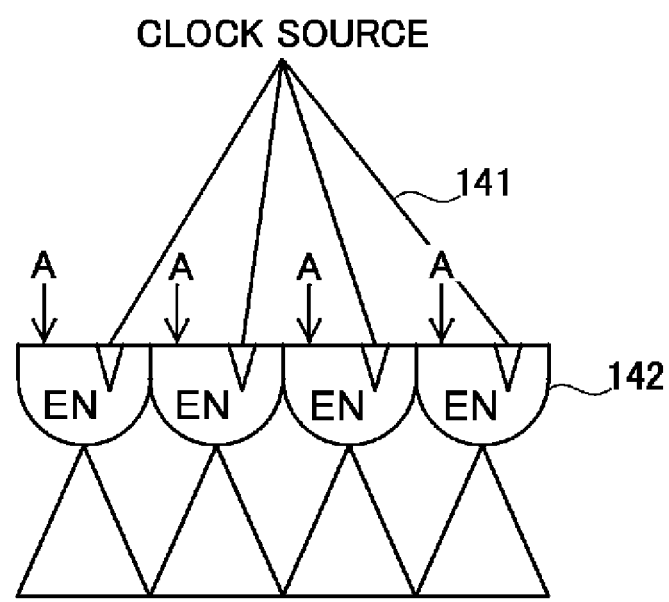
FIG. 1 illustrates conventional positions for insertion of clock-gating circuits.

Reference may now be made in detail to embodiments, examples of which are illustrated in the accompanying drawings, wherein like reference numerals refer to like elements throughout.

A clock-gating circuit insertion method, a clock-gating circuit insertion program and a designing apparatus according to the embodiment will be described in detail below with reference to accompanying drawings.

Figure 3:
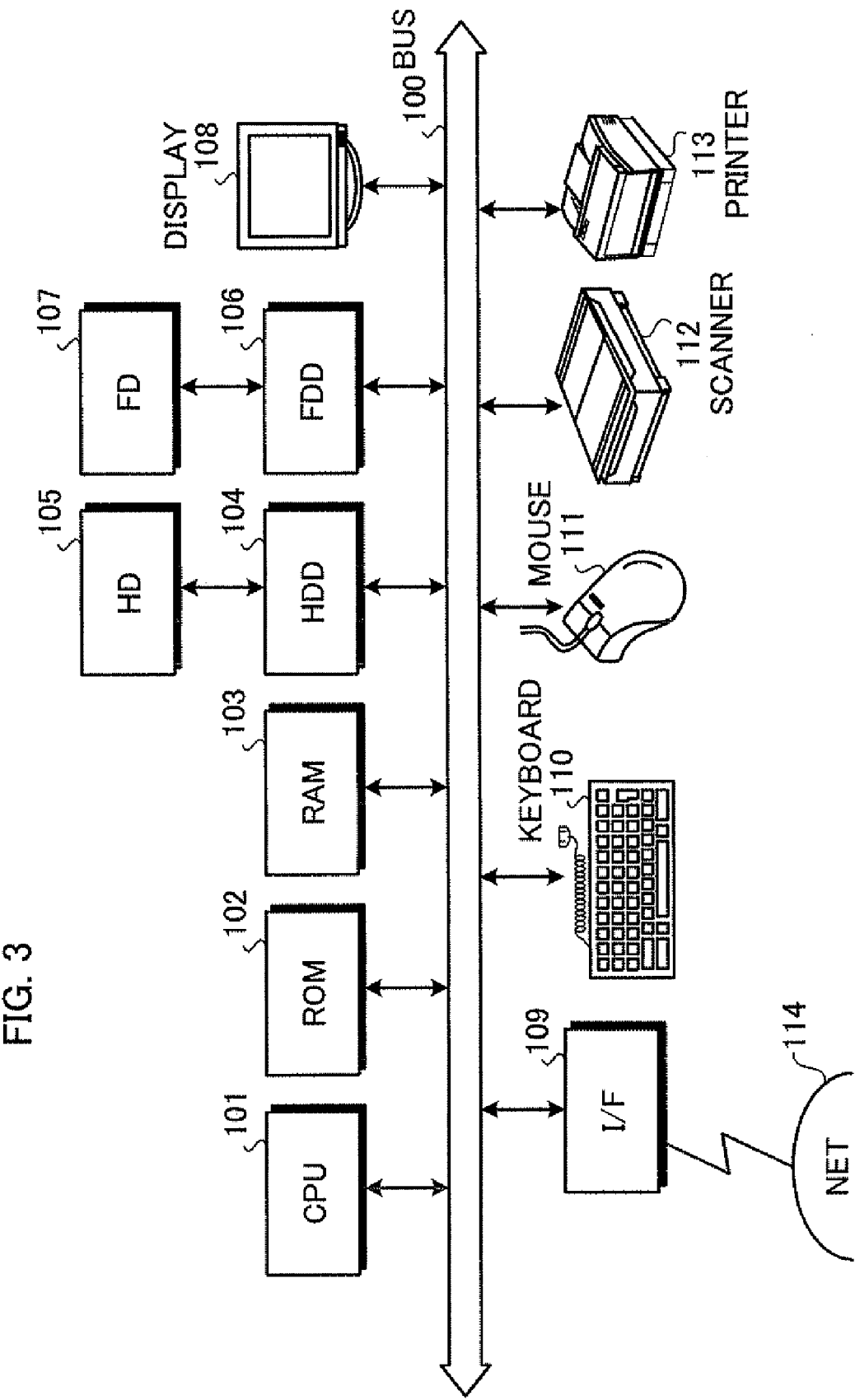
FIG. 3 illustrates the hardware configuration of a designing apparatus according to one embodiment.

FIG. 3 illustrates the hardware configuration of a designing apparatus according to one embodiment.

As shown in FIG. 3, designing apparatus comprises a CPU 101, a ROM 102, a RAM 103, a hard disk drive (HDD) 104, a hard disk (HD) 105, a flexible disk drive (FDD) 106, a flexible disk (FD) 107 as an example of detachable recording medium, a display 108, an interface (I/F) 109, a keyboard 110, a mouse 111, a scanner 112 and a printer 113. A bus 100 connects the constituent elements.

The CPU 101 controls the whole designing apparatus of FIG. 3. The ROM 102 stores programs including a boot program. The RAM 103 is used as the work area of the CPU 101. The HDD 104 controls reading/writing of data into or out of the HD 105 under the control of the CPU 101. The HD 105 stores data written in under the control of the HDD 104.

The FDD 106 controls reading/writing of data into or out of the FD 107 under the control of the CPU 101. The FD 107 stores data written in under the control of the FDD 106 and causes the designing apparatus of FIG. 3 to read data stored in the FD 107.

The detachable recording medium may be a CD-ROM (CD-R, CD-RW), MO, digital versatile disk DVD or memory card instead of the FD 107. The display 108 displays data of a document, image, functional information or the like in addition to a cursor, icons or a toolbox. As this display 108, for instance a CRT, TFT liquid crystal display, a plasma display or the like may be used. The I/F 109 is connected to a network 114 such as the Internet via communication line, and further connected to some other unit via this network 114. The I/F 109, taking charge of interfacing between the network 114 and the inside, controls data inputting and outputting from external units. As the I/F 109, a modem or a LAN adapter may be used for instance.

The keyboard 110, provided with keys for inputting letters, numerals, various instructions and so forth, is used for inputting data. The keyboard 110 may also be a touch panel type input pad or a ten-key board. The mouse 111 is used for moving the cursor, selecting a range, or moving or altering the size of the window. A track ball or a joystick may as well be used in place of the keyboard 110 if it has similar functions as a pointing device.

The scanner 112 optically reads an image and captures image data into the designing apparatus. The scanner 112 may be provided with an OCR function. The printer 113 prints image data and document data. As the printer 113, a laser printer or an inkjet printer may be used for instance.

Figure 4:
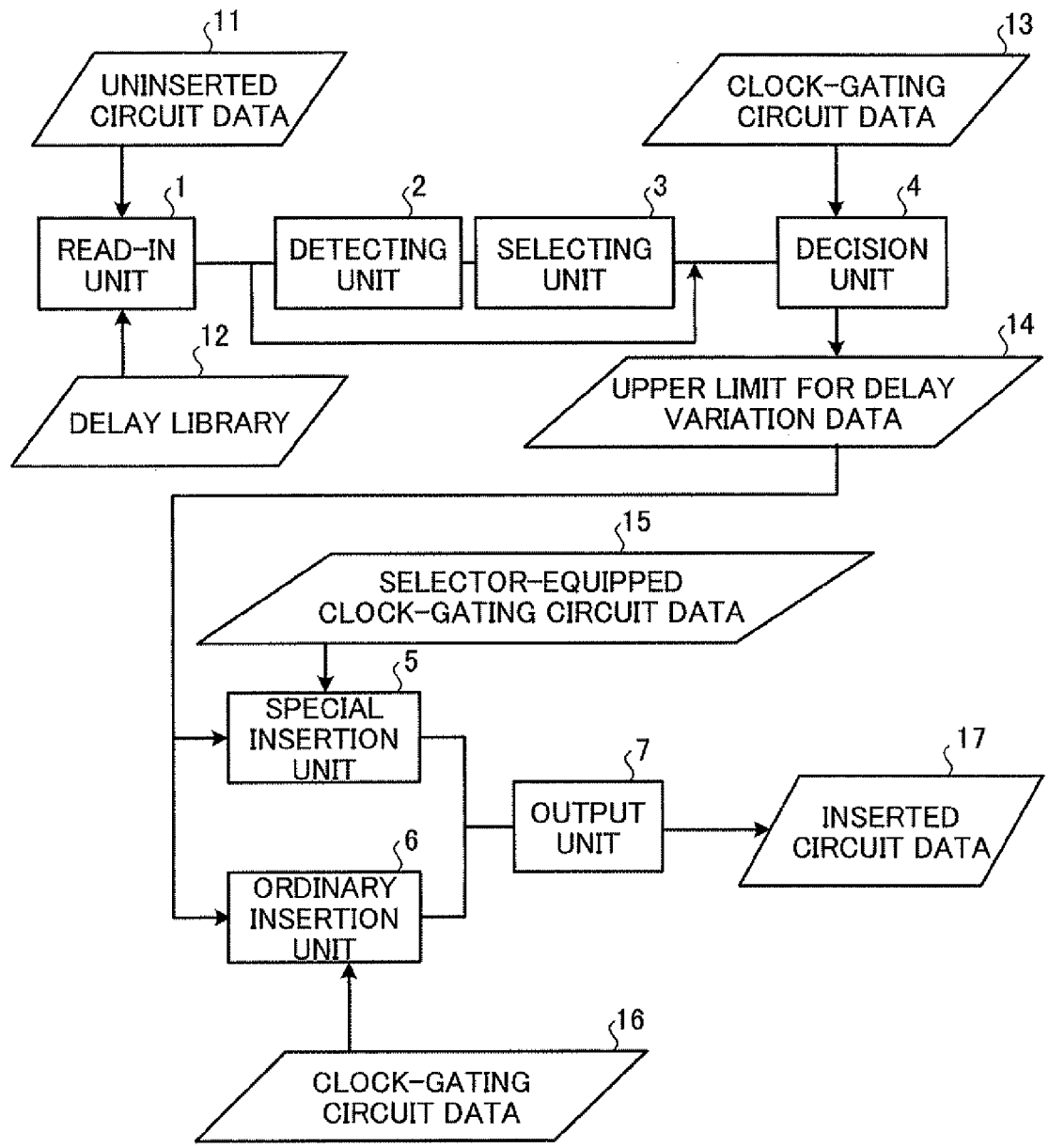
FIG. 4 illustrates the functional configuration of the designing apparatus of FIG. 3.

FIG. 4 illustrates the functional configuration of the designing apparatus of FIG. 3. As shown in FIG. 4, the designing apparatus comprises a read-in unit 1, a detecting unit 2, a selecting unit 3, a decision unit 4, a special insertion unit 5, an ordinary insertion unit 6 and an output unit 7.

As further shown in FIG. 4, the read-in unit 1 reads uninserted circuit data 11 and a delay library 12 in. The uninserted circuit data 11 are data on circuits into which no clock-gating circuit is inserted. On the basis of the uninserted circuit data 11 read in by the read-in unit 1, the detecting unit 2 detects positions suitable for the insertion of clock-gating circuits. The selecting unit 3 selects, out of the positions detected by the detecting unit 2 as being suitable for the insertion of clock-gating circuits, one position as the candidate position for insertion for the clock-gating circuit.

As further shown in FIG. 4, the decision unit 4 acquires clock-gating circuit data 13 and inserts the clock-gating circuit into the candidate position for insertion selected by the selecting unit 3. Further, the decision unit 4 performs timing analysis of the enable signal for the clock-gating circuit on the basis of the delay library 12 read in from the read-in unit 1 and determines the upper limit for delay variations for the enable signal to satisfy the setup conditions.

As further shown in FIG. 4, the special insertion unit 5 acquires upper limit for delay variations data 14 and, if both a first condition that the upper limit for delay variations is not below a prescribed value and a second condition that the upper limit for delay variations of the integrated circuit is below the condition of delay variations in the normal setup timing analysis performed at the time of designing are satisfied, acquires selector-equipped clock-gating circuit data 15 and inserts the selector-equipped clock-gating circuit into the candidate position for insertion selected by the selecting unit 3.

If the upper limit for delay variations is below the prescribed value, no sufficient effect to save power consumption may be achieved even if a clock-gating circuit is inserted by the special insertion unit 5 of FIG. 4. Therefore, if the first condition is not met, no clock-gating circuit needs to be inserted into the candidate position for insertion.

Further, if the upper limit for delay variations is not below the condition of delay variations in the normal setup timing analysis, the enable signal will satisfy the setup condition all the time, and accordingly no selector circuit needs to be inserted by the special insertion unit 5 of FIG. 4.

Therefore, if the second condition is not satisfied, an ordinary clock-gating circuit, namely a clock-gating circuit not equipped with a selector circuit, may be inserted into the candidate position for insertion by the ordinary insertion unit 6 of FIG. 4.

Figure 5:
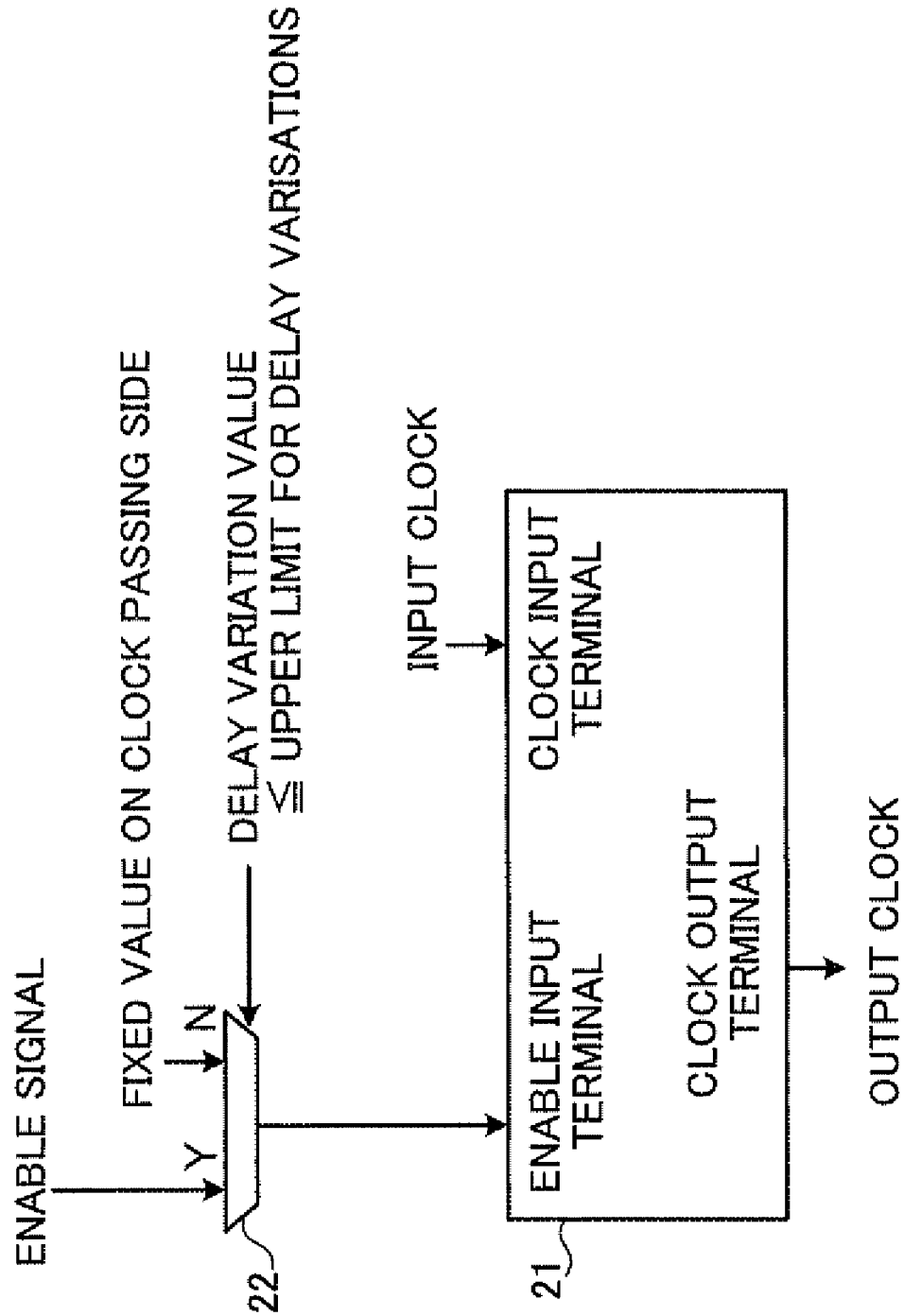
FIG. 5 illustrates a selector-equipped clock-gating circuit according to one embodiment.

FIG. 5 illustrates a selector-equipped clock-gating circuit according to one embodiment. The selector-equipped clock-gating circuit has a configuration in which the output terminal of a selector circuit 22 is connected to the enable input terminal of a clock-gating circuit 21. The selector circuit 22 is so connected as to enable the following signals to be inputted to the respective input terminals. A control signal indicating whether or not delay variations are at or below the upper limit for delay variations is inputted to a control input terminal.

As shown in FIG. 5, the enable signal is inputted to the Y-side input terminal which is selected when delay variations are not above the upper limit for delay variations. A signal which fixes the clock-gating circuit 21 in the state in which the clock signal passes inputted to the N-side input terminal which is selected when delay variations are above the upper limit for delay variations.

It is to be noted here that, in a fabricated integrated circuit, delay variations may be known from delay variation information on the integrated circuit. Each individual fabricated integrated circuit has a configuration for referencing within the integrated circuit information on manufacturing variations of element delays, and the delay variation information may as well be obtained by using that configuration. This configuration for referencing variation information may, for instance, be such that a delay monitoring circuit disposed within the integrated circuit references manufacturing variations of element delays according to the result of monitoring by the delay monitoring circuit.

Alternatively, to reference manufacturing variations of element delays, delay variation information obtained by a delay test at the time of product inspection may be imprinted within the integrated circuit by the use of a fuse or recorded in a nonvolatile memory such as a ROM. If delay variations are not above the upper limit for delay variations in a fabricated integrated circuit, the selector circuit 22 of FIG. 5 will select and output an enable signal or, if delay variations surpass the upper limit for delay variations, it will select and output a signal which fixes the clock signal in the passing state.

Figure 2:
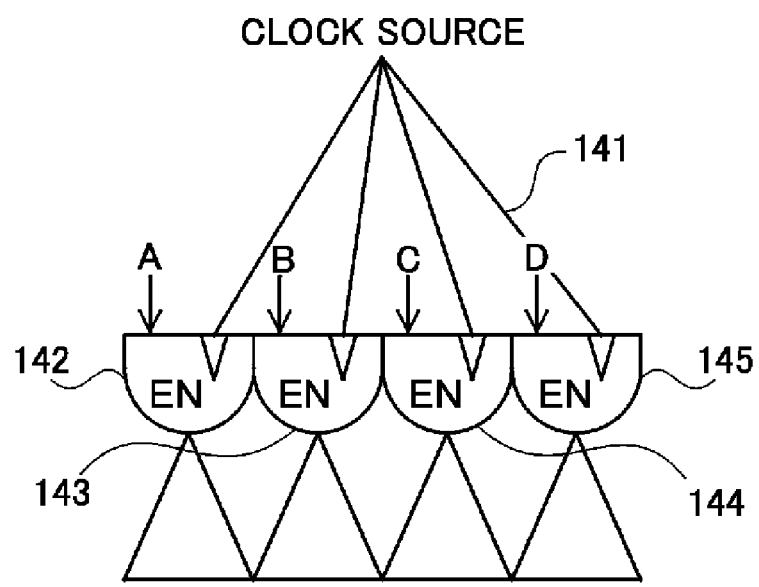
FIG. 2 illustrates other conventional positions for insertion of clock-gating circuits.

The clock-gating circuit 21 of FIG. 5 performs control to pass or intercept a clock signal in accordance with the output signal of the selector circuit 22. The ordinary insertion unit 6 of FIG. 2, as stated above, will acquire the clock-gating circuit data 16 of FIG. 4 if the first condition is met and the second condition is not met, and insert an ordinary clock-gating circuit into the candidate position for insertion selected by the selecting unit 3 of FIG. 4.

The ordinary clock-gating circuit is the same as the clock-gating circuit 21 of FIG. 5 except that an enable signal is inputted to its enable input terminal. The output unit 7 of FIG. 4 outputs inserted circuit data 17 on the insertion of a selector-equipped clock-gating circuit or an ordinary clock-gating circuit by the special insertion unit 5 of FIG. 4 or the ordinary insertion unit 6 of FIG. 4, respectively.

The read-in unit 1, detecting unit 2, selecting unit 3, decision unit 4, special insertion unit 5, ordinary insertion unit 6 and output unit 7 of FIG. 5 so far described are enabled to realize their respective functions by the execution by the CPU 101 of a program recorded in a recording medium such as the ROM 102, RAM 103 or HD 105 shown in FIG. 3 or by the I/F 109. The uninserted circuit data 11, delay library 12 and inserted circuit data 17 are recorded in a recording medium such as the HD 105.

Figure 6:
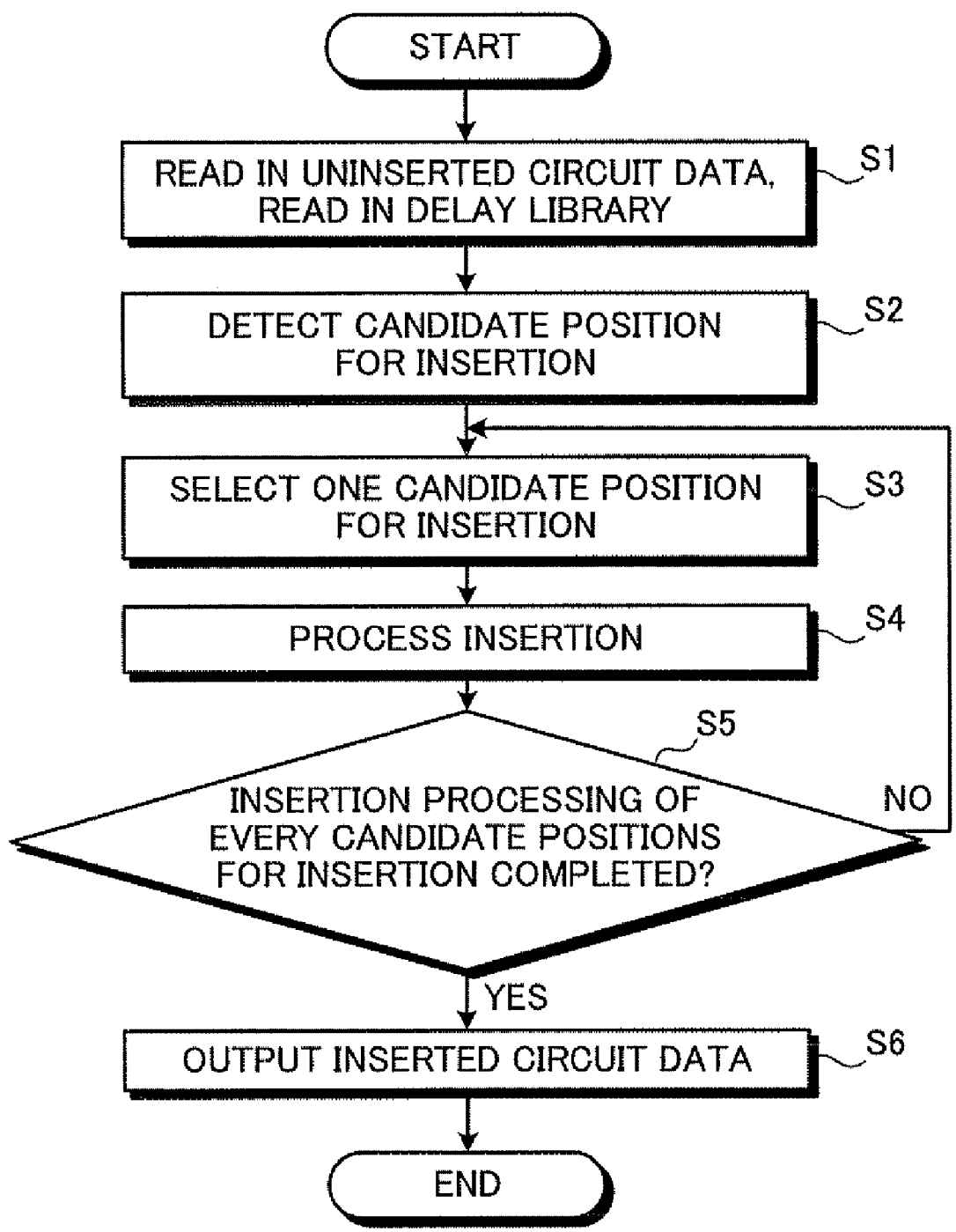
FIG. 6 illustrates a flow-chart of a clock-gating circuit insertion process according to one embodiment.

FIG. 6 charts a clock-gating circuit insertion process according to one embodiment. When the process to insert a clock-gating circuit is started, first the read-in unit 1 of FIG. 4 reads in the uninserted circuit data 11 and the delay library 12 (operation S1).

As charted in FIG. 6, the detecting unit 2 of FIG. 4 detects suitable positions for inserting the clock-gating circuit (candidate position for insertion) on the basis of circuit data read in at operation S1 (operation S2). Then, the selecting unit 3 of FIG. 4 selects one out of the candidate position for insertion detected at operation S2 (operation S3). Next, the clock-gating circuit is inserted into the candidate position for insertion selected at operation S3 (operation S4). The insertion process will be described in detail below.

As further charted in FIG. 6, after the insertion process at operation S4 is completed, it is determined whether or not every candidate position for insertion detected at operation S2 has gone through the insertion process of operation S4 (operation S5). If any candidate position for insertion is found having undergone no insertion process of operation S4 (operation S5: No), the sequence will return to operation S3 to select another candidate position for insertion, and the selected candidate position for insertion will be processed for insertion of the clock-gating circuit (operation S4).

As further charted in FIG. 6, if the determination at operation S5 reveals completion of insertion process of operation S4 for every candidate position for insertion (operation S5; Yes), the output unit 7 of FIG. 4 will output the inserted circuit data 17 indicating the insertion of the clock-gating circuit (operation S6), and the sequence of clock-gating circuit insertion process will end.

Figure 7:
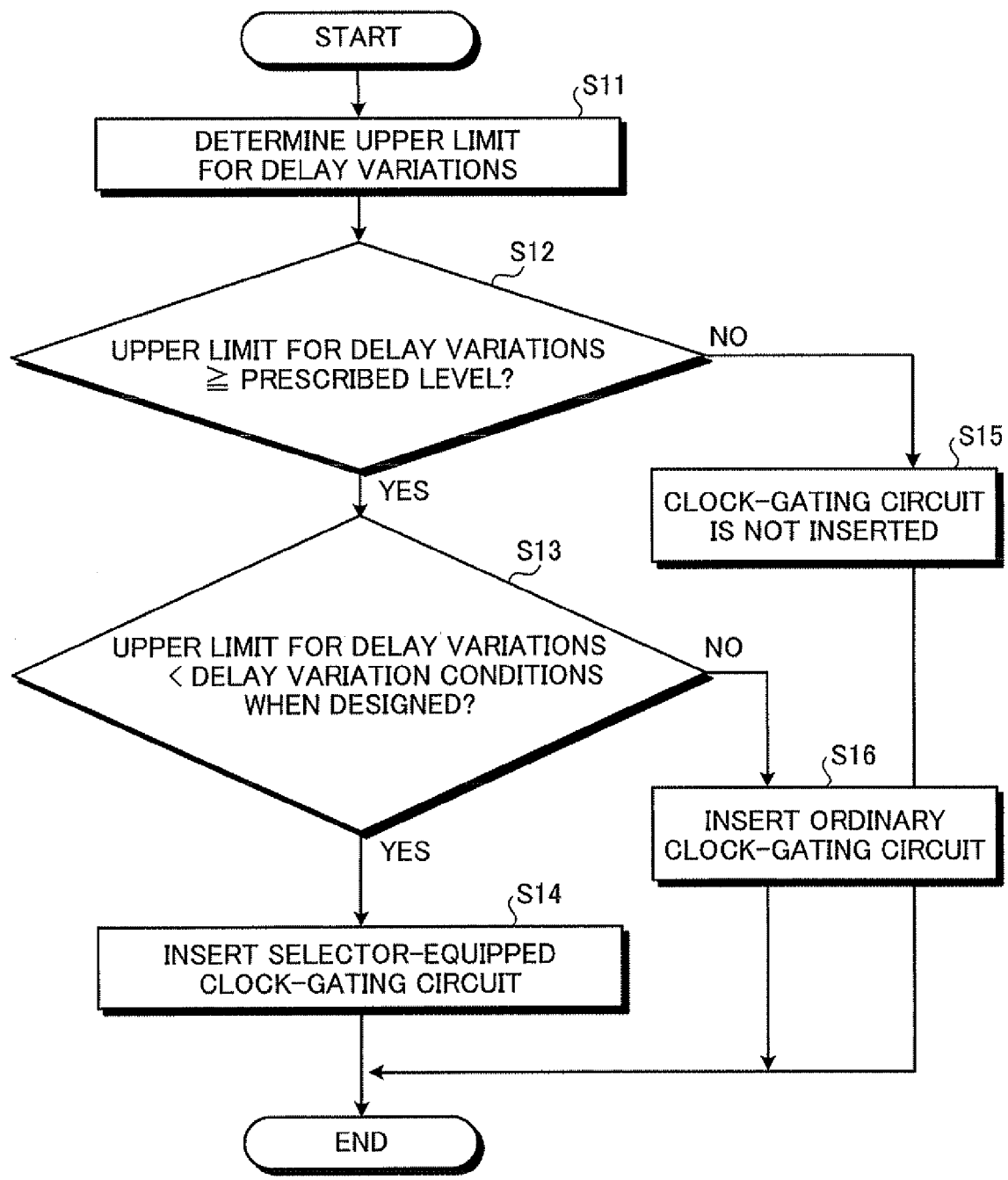
FIG. 7 illustrates the insertion process of FIG. 6.

FIG. 7 outlines the insertion process for clock-gating circuit insertion charted in FIG. 6. The decision unit 4 of FIG. 4 acquires the clock-gating circuit data 13, and inserts the clock-gating circuit into the candidate position for insertion selected at operation S3 of FIG. 6. Timing analysis of the enable signal for the clock-gating circuit is performed on the basis of the delay library read in at operation S1 of FIG. 6, and this enable signal determines the upper limit for delay variations for satisfying the setup conditions (operation S11).

As charted in FIG. 7, it is determined whether or not the upper limit for delay variations determined at operation S11 is not below a prescribed level set in advance (operation S12). If the result of determination at operation S12 reveals that the upper limit for delay variations is not below the prescribed level (operation S12: Yes), it will be further determined whether or not the upper limit for delay variations is below the delay variation conditions found in the ordinary setup timing analysis performed at the time of designing (operation S13).

As further charted in FIG. 7, if the result of determination at operation S13 reveals that the upper limit for delay variations is below the delay variation conditions (operation S13: Yes), the special insertion unit 5 of FIG. 4 will acquire the selector-equipped clock-gating circuit data 15. Then it inserts the selector-equipped clock-gating circuit into the candidate position for insertion selected at operation S3 of FIG. 6 (operation S14) to complete the sequence of the insertion process. The forms of connection of signal lines to the terminals of the selector-equipped clock-gating circuit are as described above.

As further charted in FIG. 7, if the result of determination at operation S13 reveals that the upper limit for delay variations is at or above the delay variation conditions (operation S13: No), the ordinary insertion unit 6 of FIG. 4 will acquire the clock-gating circuit data 16 for the ordinary clock-gating circuit equipped with no selector circuit. Then it inserts that ordinary clock-gating circuit into the candidate position for insertion selected at operation S3 of FIG. 6 (operation S16) to complete the sequence of the insertion process. The forms of connection of signal lines to the terminals of the ordinary clock-gating circuit are as described above.

As further charted in FIG. 7, if the result of determination at operation S12 reveals that the upper limit for delay variations is below the prescribed level (operation S12: No), operation S13 and operation S14 will be skipped, and the sequence of the insertion process will be completed without inserting either the ordinary clock-gating circuit or the selector-equipped clock-gating circuit into the candidate position for insertion selected at operation S3 (operation S15).

A detailed example of the insertion process charted in FIG. 7 will be described with reference to FIGS. 8 through 10. In this detailed example, the delay variations obtained from the delay variation information of the integrated circuit are expressed in a plurality of delay levels differing stepwise in the extent of delay variation. Further, the upper limit for delay variations is represented by the upper limit of delay levels for the enable signal to satisfy the setup conditions out of the plurality of delay levels.

Figure 8:
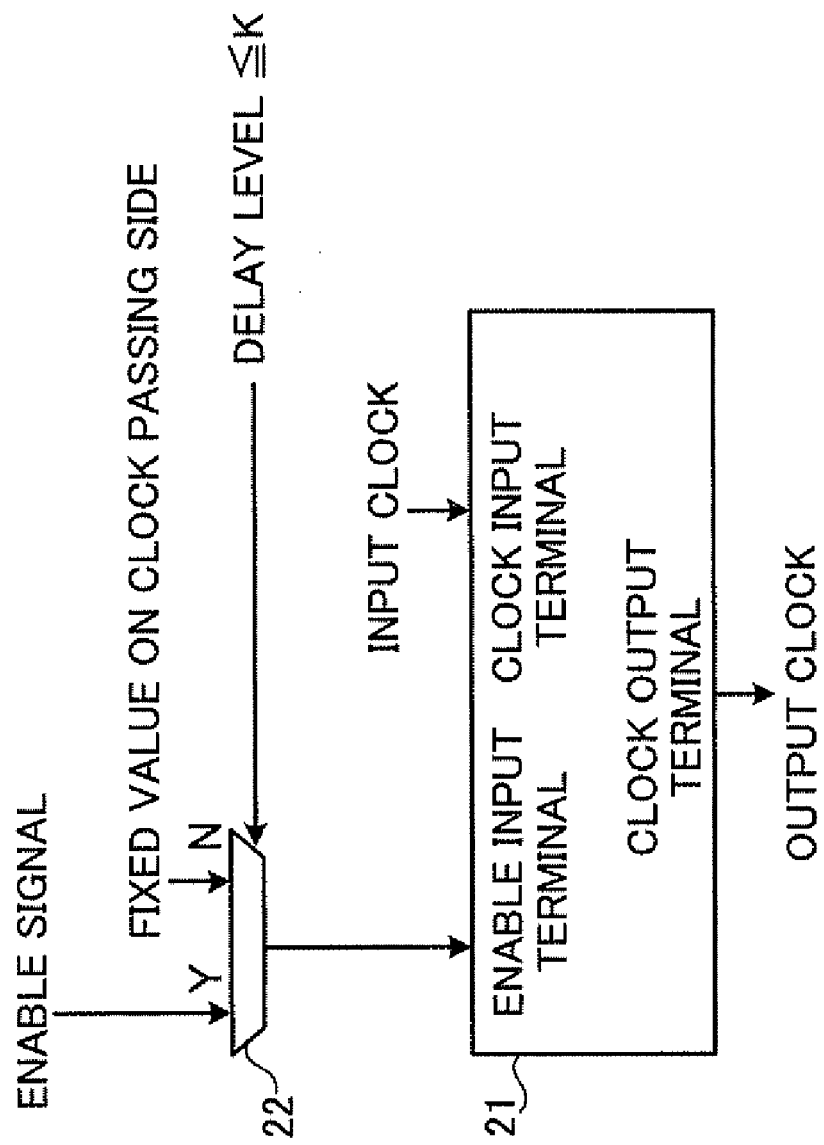
FIG. 8 illustrates a selector-equipped clock-gating circuit corresponding to the process of FIG. 6.

FIG. 8 illustrates the configuration of the selector circuit 22 in the selector-equipped clock-gating circuit. A control signal indicating whether the delay level is not above k is inputted to the control input terminal of the selector circuit 22. The value k here, obtained by timing analysis of the enable signal, is the upper limit of delay level for the enable signal to satisfy the setup conditions. Other input terminals and output terminals of the selector circuit 22 were already described with reference to FIG. 5.

Figure 9:
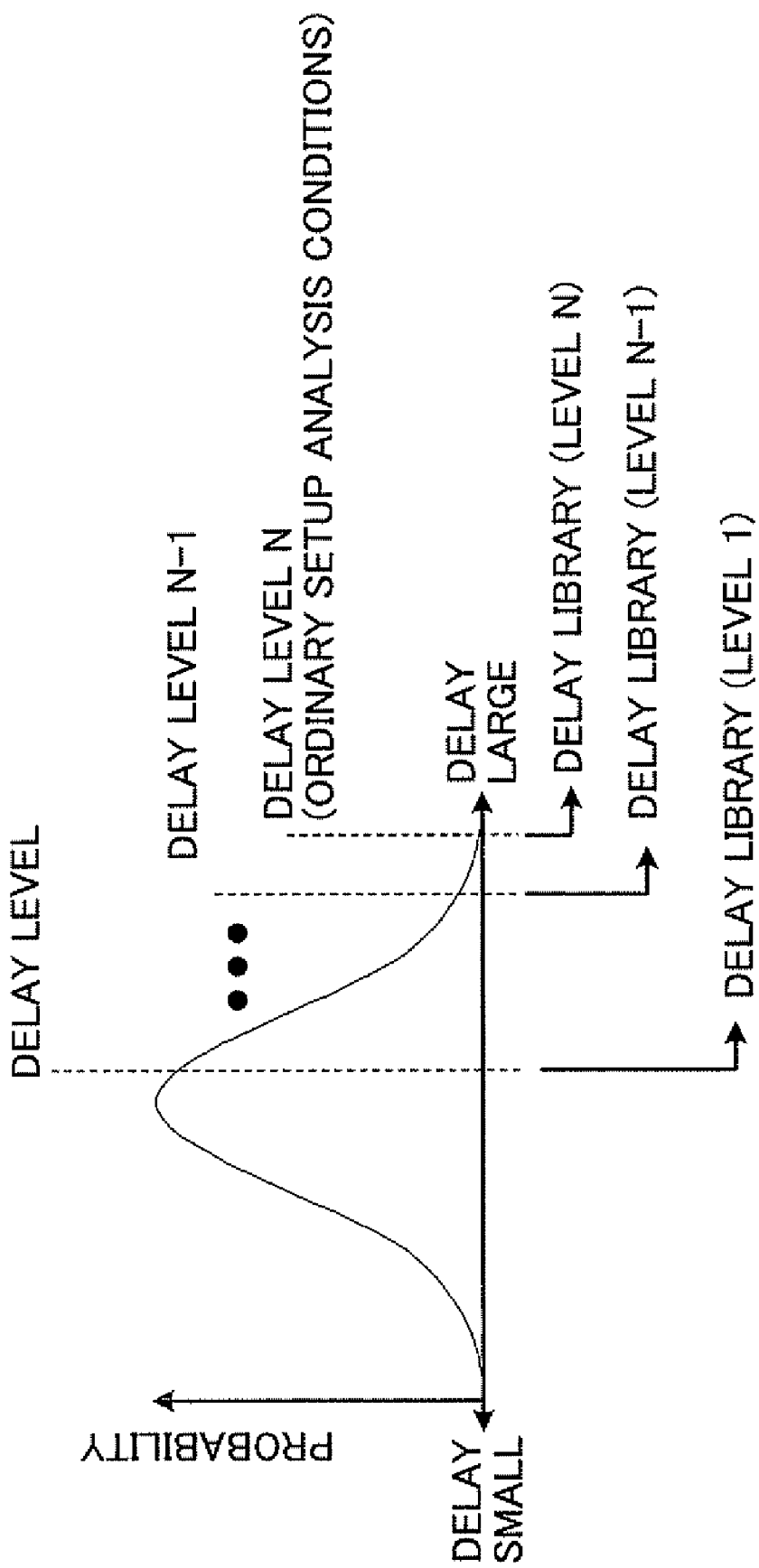
FIG. 9 diagrams the relationship between the element delay level and the delay library reflecting variations in the manufacturing process.

As diagrammed in FIG. 9, a plurality of conditions for timing analysis (process variation, voltage and temperature) is made available in a stepwise manner depending on levels of delay variations. They are conditions for use in ordinary setup timing analysis and a plurality of conditions where the delay is smaller.

As further diagrammed in FIG. 9, a delay level n is the condition used in ordinary setup timing analysis, the level of the greatest delay. A delay level 1 is the level of the smallest delay. A delay library is made available for each delay level. It is to be noted that n is an integer no smaller than 2.

Figure 10:
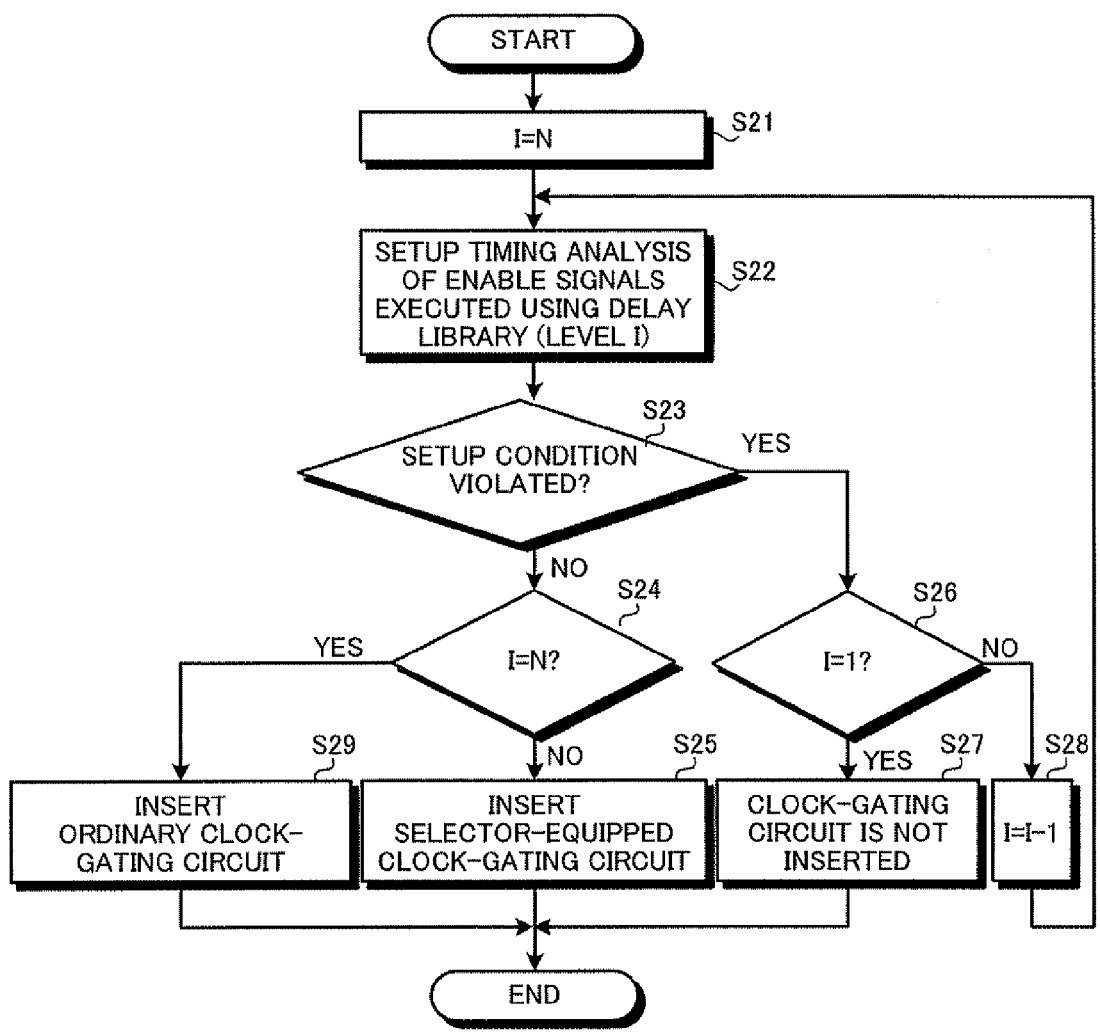
FIG. 10 charts details of the insertion process for clock-gating circuit insertion charted in FIG. 6.

FIG. 10 charts details of the insertion process charted in FIG. 6. At operation S1 of FIG. 6, the delay libraries for all the delay levels from 1 through n are read in advance. As further charted in FIG. 10, the value of a variable i is set to n (operation S21). Then, clock-gating circuits are inserted into the candidate position for insertion selected at operation S3 of FIG. 6, and the enable signals of the clock-gating circuits are subjected to setup timing analysis on the basis of the delay library of delay level i (operation S22).

As charted in FIG. 10, whether or not the setup condition is violated is determined according to the result of timing analysis (operation S23). If the result indicates satisfaction of the setup conditions (operation S23: No), it will be further determined whether or not the value of the variable i is n (operation S24). If the value of the variable i is not n (operation S24: No), a selector-equipped clock-gating circuit is inserted into the candidate position for insertion selected at operation S3 (operation S25) to complete the sequence of the insertion process.

As further charted in FIG. 10, if the determination at operation S24 indicates that the value of the variable i is equal to n (operation S24: Yes), an ordinary clock-gating circuit will be inserted into the candidate position for insertion selected at operation S3 of FIG. 6 (operation S29) to complete the sequence of the insertion process. Or if the determination at operation S23 reveals violation of the setup conditions (operation S23: Yes), it will be further determined whether or not the value of the variable i is 1 (operation S26).

As further charted in FIG. 10, if the value of the variable i is found different from 1 (operation S26: No), the value of the variable i will be reduced by 1 (operation S28), the process will return to operation S22 and repeat the following operations. If the determination at operation S26 reveals that the value of the variable i is equal to 1 (operation S26: Yes), it will mean that the setup conditions are violated at every delay level. In this case, therefore, the sequence of the insertion process will be completed without inserting either the ordinary clock-gating circuit or the selector-equipped clock-gating circuit into the candidate position for insertion selected at operation S3 of FIG. 6 (operation S27).

In addition, where there is a plurality of enable signal candidates differing in path delay for a specific candidate position for insertion, each enable signal is subjected to setup timing analysis. Also, a multi-input selector circuit is used as the selector circuit for the selector-equipped clock-gating circuit. Each enable signal and a signal which fixes the clock-gating circuit in the state wherein a clock signal is passing are inputted to the multi-input selector circuit. In this case, the enable signal is switched over according to the range of variation levels.

Incidentally, in a fabricated integrated circuit, there is needed a signal which indicates whether or not the extent of delay obtained from delay variation information on the integrated circuit surpasses each of the plurality of delay levels. Therefore, a device to generate that signal (hereinafter referred to as the signal generating device) is made ready in the integrated circuit. For use as this signal generating device, an ordinary logic circuit or conversion table is conceivable for instance.

Figure 11:
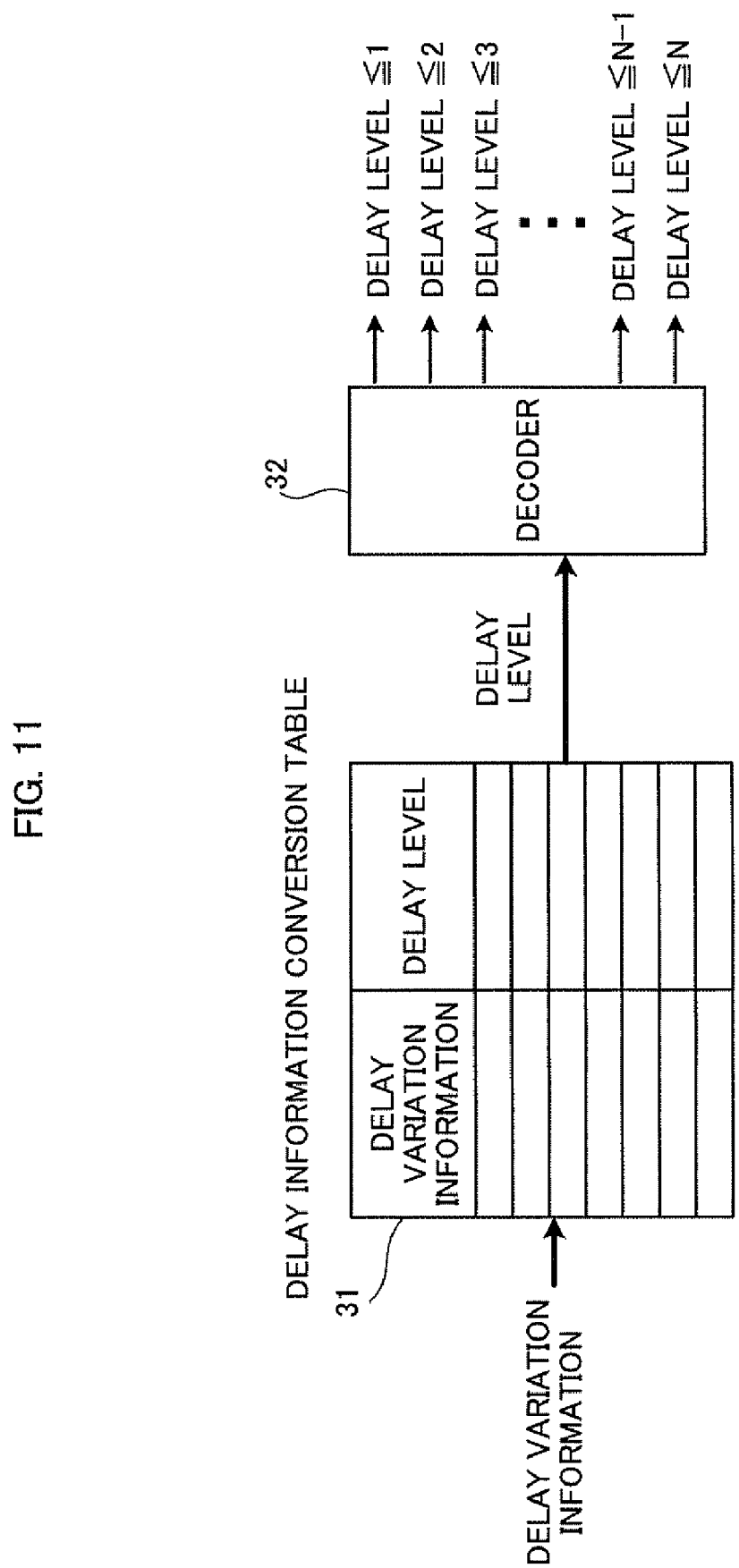
FIG. 11 illustrates a signal generating device according to one embodiment.

FIG. 11 illustrates one example of a signal generating device. The signal generating device is so configured as to convert delay variation information into delay levels according to a delay information conversion table 31. The signal generating device outputs a signal which indicates whether or not the extent of delay surpasses of the plurality of delay levels by decoding the delay levels with a decoder 32.

As shown in FIG. 11, a signal indicating whether or not the delay level is not above 1, one indicating whether or not the delay level is not above 2, and one indicating whether or not the delay level is n or below are outputted from the decoder 32. A terminal of the decoder 32 which outputs a signal indicating whether or not the delay level is 3 or below out of these signals is connected to the control input terminal of the selector circuit 22 of FIG. 8 of the selector-equipped clock-gating circuit, where the value k of the upper limit of delay level for the enable signal to satisfy the setup conditions is 3 for instance.

For instance, where the value k of the upper limit of delay level for the enable signal to satisfy the setup conditions is 3, what takes place is as follows. If the delay variation information of a fabricated integrated circuit shows a value corresponding to what lies between the delay level 2 and the delay level 3, the value of the decoder 32 of FIG. 11 indicating whether or not the delay level is 3 or below will be true. Therefore, the selector circuit 22 of FIG. 8 selects an enable signal and supplies it to the enable input terminal of the clock-gating circuit 21.

On the other hand, if the delay variation information of the fabricated integrated circuit is greater than a value corresponding to the delay level 3, the value of the decoder 32 of FIG. 11 indicating whether or not the delay level is 3 or below will be false. Therefore, the selector circuit 22 of FIG. 8 selects the signal which fixes the clock-gating circuit in the state wherein a clock signal is passing, and supplies it to the enable input terminal of the clock-gating circuit 21 of FIG. 8.

Figure 12:
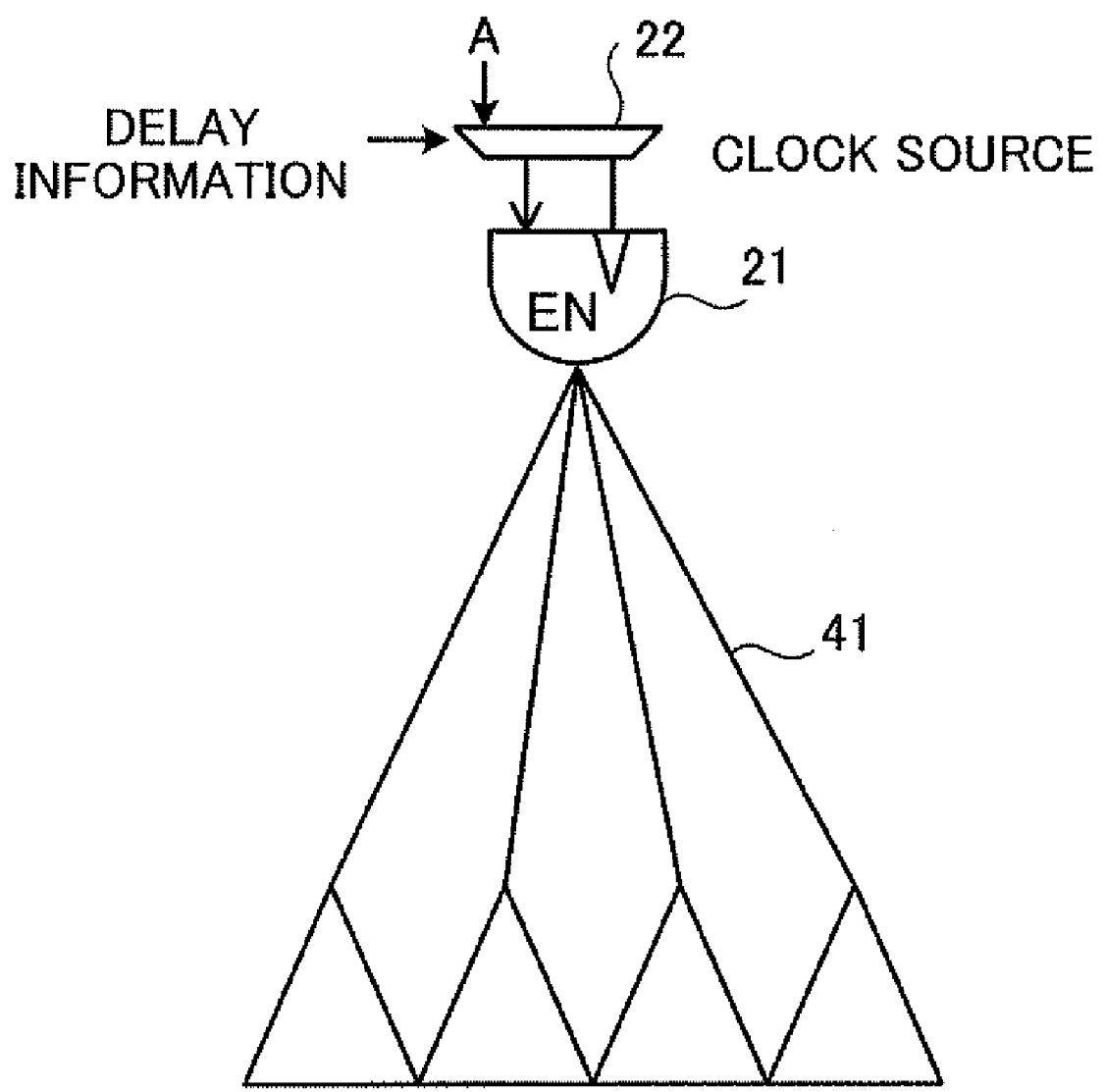
FIG. 12 illustrates one position for insertion of a selector-equipped clock-gating circuit according to one embodiment.
Figure 13:
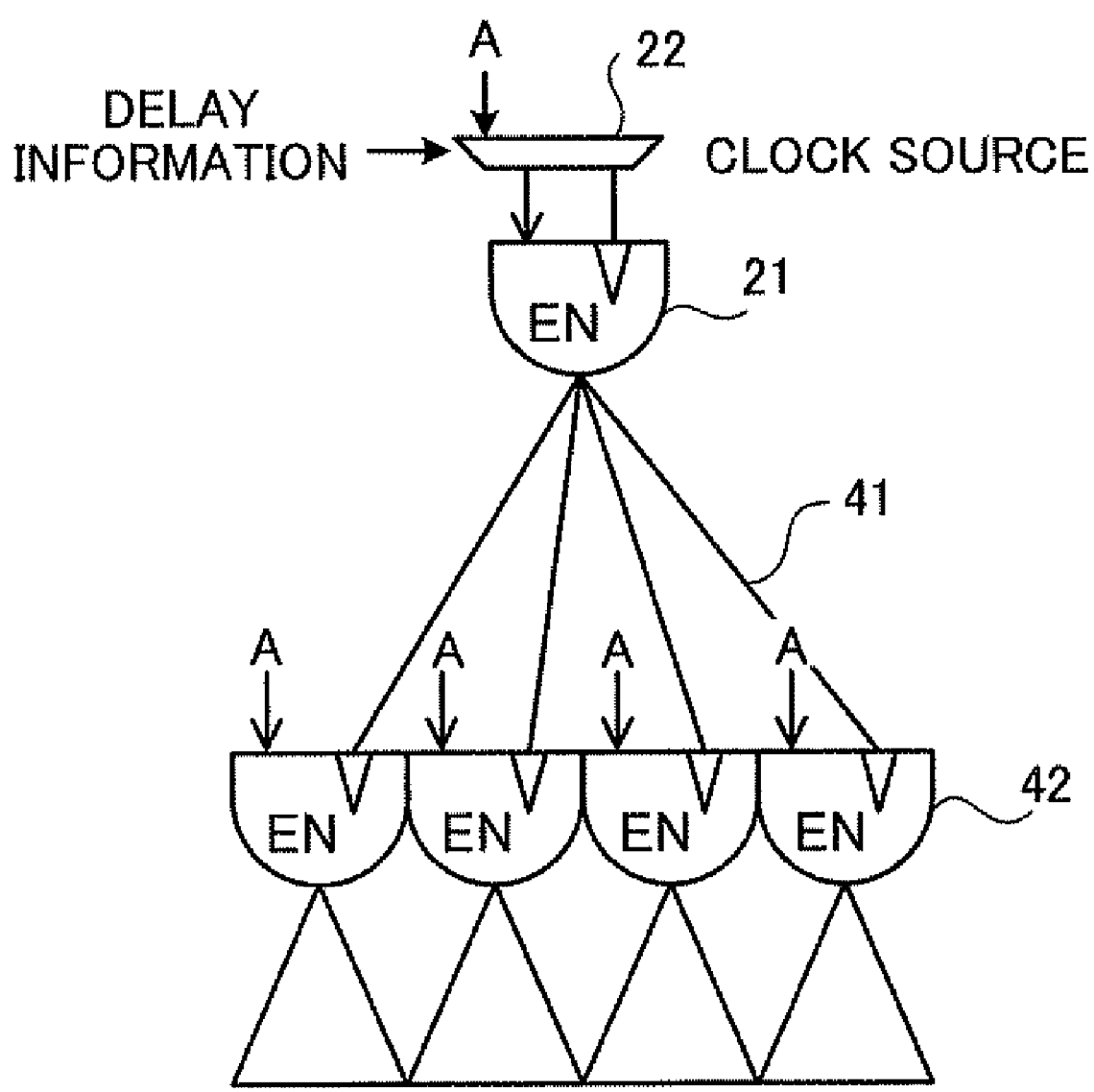
FIG. 13 illustrates another position for insertion of a selector-equipped clock-gating circuit according to one embodiment.
Figure 14:
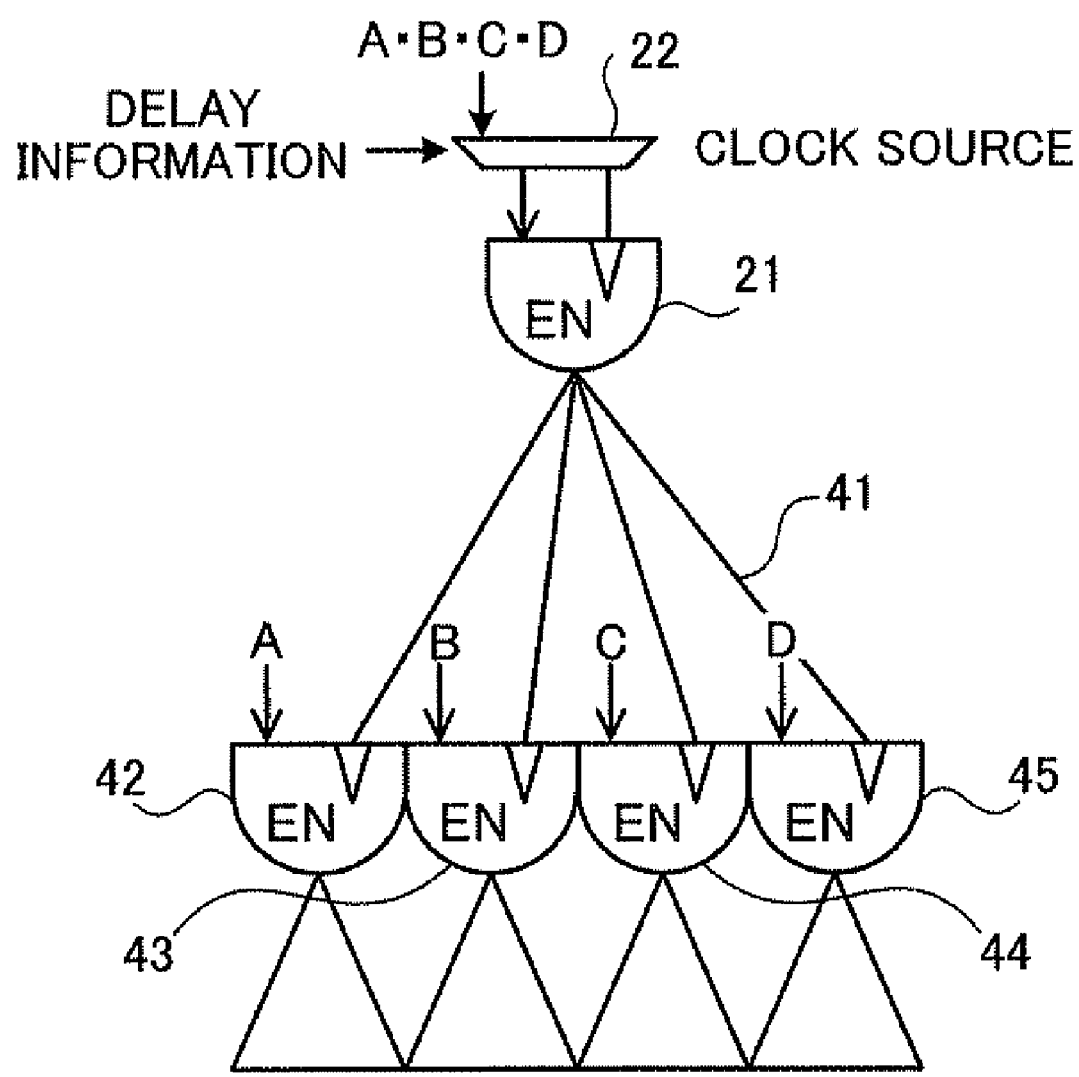
FIG. 14 illustrates still another position for insertion of a selector-equipped clock-gating circuit according to one embodiment.

FIG. 12, FIG. 13 and FIG. 14 illustrate positions for insertion of a selector-equipped clock-gating circuit according to one embodiment. The delay information in each of FIGS. 12, 13 and 14 is a control signal inputted to the control input terminal of the selector circuit 22 of FIG. 8 and indicating whether or not the delay level is k or below.

As shown in FIG. 12, by processing clock-gating circuit insertion according to this embodiment, a selector-equipped clock-gating circuit comprising the clock-gating circuit 21 and the selector circuit 22 may be inserted farther upstream of a clock tree 41. Even where it may be totally impossible to insert a clock-gating circuit 42, the selector-equipped clock-gating circuit may be inserted by processing clock-gating circuit insertion according to the embodiment.

As shown in FIG. 13, even where the clock-gating circuit 42 is already inserted into the clock tree 41, the selector-equipped clock-gating circuit comprising the clock-gating circuit 21 and the selector circuit 22 may be inserted farther upstream of the clock tree 41 by processing clock-gating circuit insertion according to the embodiment. Therefore, by intercepting the clock signal with the selector-equipped clock-gating circuit, the clock signal may be intercepted farther upstream than the already installed clock-gating circuit 42.

As further shown in FIG. 13, where the selector-equipped clock-gating circuit is to be inserted farther upstream of the clock tree in an already clock-gated circuit, if the reduction in switching power on the clock tree by the insertion of the selector-equipped clock-gating circuit is greater than the increase in power consumption, there will be a net saving in power consumption. It is supposed here, for instance, that positions constituting 30% of the whole clock tree permit gating and the probability of clock gating is 90%.

On the other hand, it may be supposed that the embodiment may make possible gating in additional positions constituting 20% of the whole clock tree and the probability of clock gating in those parts is 70%. In this case, the switching power saving effect on the clock tree will be about 19% (=0.2×0.7/(1−0.3×0.9)).

As shown in FIG. 14, by processing clock-gating circuit insertion according to this embodiment, the selector-equipped clock-gating circuit comprising the clock-gating circuit 21 and the selector circuit 22 may be inserted farther upstream of the clock tree 41.

As further shown in FIG. 14, signals resulting from AND logic operation of the respective enable signals A, B, C and D of the clock-gating circuits 42, 43, 44 and 45 are inputted to the enable input terminals of the selector circuit 22. Therefore, when a clock signal is to be intercepted in every one of the clock-gating circuits 42, 43, 44 and 45 with the respective enable signals A, B, C and D, the clock signal may be intercepted by the clock-gating circuit 21 inserted farther upstream of the clock tree 41.

It may be possible to insert the clock-gating circuit in a position near a terminal point of the clock tree so as to satisfy the setup conditions for enable signals.

In the aforementioned embodiment, the selector-equipped clock-gating circuit may be inserted farther upstream of the clock tree. Since the aforementioned embodiment dispenses with the clock-gating circuit arranged downstream of the clock tree, a corresponding part of the power consumption by the clock-gating circuit dispensed with is saved. Furthermore, as the clock signal may be intercepted in the part between the selector-equipped clock-gating circuit arranged farther upstream of the clock tree and the clock-gating circuit conventionally arranged down stream, the switching power may be saved correspondingly. Therefore, a further reduction in power consumption may be made possible.

Generally, a semiconductor chip with a small element delay has greater leak current than a chip with a great element delay. For this reason, power consumption by an integrated circuit is the worst for a chip with a small element delay. Since a chip with a great element delay due to variations always passes clock signals according to one embodiment, a chip with a great element delay may be greater in power consumption. However, in the aforementioned embodiment, if the element delay is small the selector-equipped clock-gating circuit may be inserted farther upstream of the clock tree. Consequently the power consumption of the chip with a small element delay, which would otherwise consume more power, may be effectively reduced. Therefore, the overall consumption amperage of the integrated circuit may be reduced.

In the aforementioned embodiment, the fabricated integrated circuit requires, among other elements, a circuit which generates, converts and distributes delay variation information on elements. However, when the integrated circuit is in normal operation, such circuits scarcely operate. Therefore, if those circuits are fabricated of transistors whose leak currents are small, the power consumption of the circuits may be kept low, and accordingly would not obstruct power saving.

In the aforementioned embodiment, a selector-equipped clock-gating circuit is inserted where setup conditions for the enable signal are found violated in timing analysis at the time of designing. In an integrated circuit whose element delay is small, an enable signal is selected by the selector circuit and supplied to the clock-gating circuit of its selector-equipped clock-gating circuit. As the enable signal arrives at the clock-gating circuit earlier than the clock signal where the element delay is small, the clock signal may be prevented from being communicated farther downstream of the clock tree by the clock-gating circuit.

The invention is not limited to the embodiment described above, but may be altered in various ways. For instance in the flow charted in FIG. 10, the variable i may be increased from 1 instead of being gradually decreased from n. Where there is a fear that the selector-equipped clock-gating circuit inserted upstream of the clock tree in this embodiment may fail to intercept the clock signal and thereby affect normal operation of circuits, an ordinary clock-gating circuit may be inserted farther downstream of the clock tree than the selector-equipped clock-gating circuit.

The clock-gating circuit insertion method described with reference to the embodiment may be realized by having a computer, such as a personal computer or a work station, execute a prepared program. This program is recorded on a computer-readable recording medium, such as a hard disk, flexible disk, CD-ROM, MO or DVD, and read out by the computer from the recording medium to be executed. This program may as well be a transmission medium permitting distribution by a network such as the Internet.

As hitherto described, the clock-gating circuit insertion method, clock-gating circuit insertion program and designing apparatus according to one embodiment are useful for designing semiconductor integrated circuits and particularly suitable for use in designing power efficient type semiconductor integrated circuits.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A clock-gating circuit insertion method comprising:
executing by a computer processor the operations of:
    detecting a position where a clock-gating circuit is inserted based on a circuit data and a delay data,
    inserting the clock-gating circuit into the position,
    performing timing analysis of an enable signal for the clock-gating circuit, calculating an upper limit of delay variations for the enable signal to satisfy setup conditions on the basis of the result of the timing analysis, and inserting a selector-equipped clock-gating circuit including a selector circuit and a clock-gating circuit into the position for insertion, wherein the selector circuit selects and outputs the enable signal when delay variations are not above the upper limit, and selects and outputs a signal designating a clock signal when the delay variations are above the upper limit, and the clock-gating circuit passes or intercepts the clock signal on the basis of the output signal of the selector circuit.

2. The clock-gating circuit insertion method according to claim 1, further comprising:
dispensing with the insertion of the selector-equipped clock-gating circuit into the position is when the upper limit is below a prescribed value.

3. The clock-gating circuit insertion method according to claim 1, further comprising:
inserting the selector-equipped clock-gating circuit into the position when the upper limit is not below a prescribed value.

4. The clock-gating circuit insertion method according to claim 1, further comprising:
dispensing with the insertion of the selector-equipped clock-gating circuit into the position when the upper limit is the same as or greater than a condition of delay variations in ordinary setup timing analysis, and
inserting only a clock-gating circuit into the position before the clock-gating circuit outputs inserted circuit data.

5. The clock-gating circuit insertion method according to claim 1, further comprising:
inserting the selector-equipped clock-gating circuit into the position when the upper limit is below the condition of delay variations in ordinary setup timing analysis.

6. The clock-gating circuit insertion method according to claim 1, further comprising:
expressing the delay variations in a plurality of delay levels differing stepwise in the levels of delay variations, and
representing the upper limit by the upper limit of delay levels for the enable signal to satisfy the setup conditions out of the plurality of delay levels.

7. A non-transitory computer-readable recording medium storing a clock-gating circuit insertion program to be executed by a computer, the program comprising a set of codes for causing the computer to perform the operations of:
detecting a position where a clock-gating circuit is inserted based on a circuit data and a delay data,
inserting the clock-gating circuit into the position detected on the basis of a circuit data,
performing timing analysis of an enable signal for the clock-gating circuit,
calculating an upper limit of delay variations for the enable signal to satisfy setup conditions on the basis of the result of the timing analysis; and
inserting a selector-equipped clock-gating circuit including a selector circuit and a clock-gating circuit into the position for insertion,
wherein the selector circuit selects and outputs the enable signal when delay variations are not above the upper limit, and selects and outputs a signal designating a clock signal when the delay variations are above the upper limit, and the clock-gating circuit passes or intercepts the clock signal on the basis of the output signal of the selector circuit.

8. The non-transitory computer-readable recording medium according to claim 7, further comprising:
dispensing with the insertion of the selector-equipped clock-gating circuit into the position when the upper limit is below a prescribed value.

9. The non-transitory computer-readable recording medium according to claim 7, further comprising:
inserting the selector-equipped clock-gating circuit into the position when the upper limit is not below a prescribed value.

10. The non-transitory computer-readable recording medium according to claim 7: further comprising:
dispensing with the insertion of the selector-equipped clock-gating circuit into the position when the upper limit is the same as or greater than a condition of delay variations in ordinary setup timing analysis, and
inserting only a clock-gating circuit into the position before the clock-gating circuit outputs inserted circuit data.

11. The non-transitory computer-readable recording medium according to claim 7, further comprising:
inserting the selector-equipped clock-gating circuit into the position when the upper limit is below the condition of delay variations in ordinary setup timing analysis.

12. The non-transitory computer-readable recording medium according to claim 7, further comprising:
expressing the delay variations in a plurality of delay levels differing stepwise in the levels of delay variations, and
representing the upper limit by the upper limit of delay levels for the enable signal to satisfy the setup conditions out of the plurality of delay levels.

13. A clock-gating circuit insertion apparatus comprising:
a detecting part detecting a position where a clock-gating circuit is inserted based on a circuit data and a delay data,
an inserting part inserting the clock-gating circuit into the position detected on the basis of a circuit data,
a performing part performing timing analysis of an enable signal for the clock-gating circuit,
a calculating part calculating an upper limit of delay variations for the enable signal to satisfy setup conditions on the basis of the result of the timing analysis; and
a processing part inserting a selector-equipped clock-gating circuit including a selector circuit and a clock-gating circuit into the position for insertion,
wherein the selector circuit selects and outputs the enable signal when delay variations are not above the upper limit, and selects and outputs a signal designating the passing of a clock signal when the delay variations are above the upper limit, and the clock-gating circuit passes or intercepts the clock signal on the basis of the output signal of the selector circuit.

14. The clock-gating circuit insertion apparatus according to claim 13, wherein the insertion of the selector-equipped clock-gating circuit into the position is dispensed with when the upper limit is the same as or greater than a condition of delay variations in ordinary setup timing analysis, only a clock-gating circuit is inserted into the position before the clock-gating circuit outputs inserted circuit data.

* * * * *

UNITED STATES PATENT AND TRADEMARK OFFICE
CERTIFICATE OF CORRECTION

PATENT NO.       : 7,926,014 B2
APPLICATION NO.  : 12/034156
DATED            : April 12, 2011
INVENTOR(S)      : Yukihito Kawabe It is certified that error appears in the above-identified patent and that said Letters Patent is hereby corrected as shown below:

Column 12, Line 16, In Claim 10, delete "claim 7:" and insert --claim 7,--, therefor.

Signed and Sealed this
Eighteenth Day of October, 2011

David J. Kappos
*Director of the United States Patent and Trademark Office*